US005975636A

United States Patent [19]

Koch et al.

[11] Patent Number: 5,975,636

[45] Date of Patent: Nov. 2, 1999

[54] ASSEMBLY FOR FILLING VOID BETWEEN CUSHIONS OF RECLINING SEATS

[76] Inventors: Roger Koch, 311 N.E. 103rd St., Miami, Fla. 33129; Michael L. Oleson, 1721 N.E. 17th Ave., Ft. Lauderdale, Fla.

[21] Appl. No.: 09/131,450

[22] Filed: Aug. 10, 1998

Related U.S. Application Data

[60] Provisional application No. 60/055,337, Aug. 12, 1997.

[51] Int. Cl.[6] .......... B60N 2/24

[52] U.S. Cl. .......... 297/354.13; 297/354.12; 297/284.1; 297/284.4; 297/284.6

[58] Field of Search .......... 297/353, 353.13, 297/353.12, 284.1, 284.4, 284.6

[56] References Cited

U.S. PATENT DOCUMENTS

| | | | |
|---|---|---|---|
| 2,937,641 | 5/1960 | Oetinger | 297/284.1 X |
| 3,326,601 | 6/1967 | Vanderbilt et al. | 297/284.6 |
| 3,540,777 | 11/1970 | De Beaumont | 297/284.4 |
| 3,770,315 | 10/1967 | Swann . | |
| 3,770,880 | 11/1973 | Smittle et al. | 297/284.6 |
| 3,984,886 | 10/1976 | Keeton . | |
| 4,190,286 | 2/1980 | Bentley . | |
| 4,516,568 | 5/1985 | Baxter et al. | 297/284.6 X |
| 4,589,695 | 5/1986 | Isono | 297/284.6 X |
| 4,592,588 | 6/1986 | Isono et al. | 297/284.6 |
| 4,615,563 | 10/1986 | Kobayashi | 297/284.6 |
| 4,707,027 | 11/1987 | Horvath et al. | 297/284.6 |
| 4,738,486 | 4/1988 | Surber | 297/284.6 X |
| 4,792,186 | 12/1988 | Benjamin et al. | 297/284.6 |
| 4,840,425 | 6/1989 | Noble | 297/284.1 |
| 4,875,734 | 10/1989 | Yokoyama | 297/284.1 |
| 4,938,528 | 7/1990 | Scott | 297/284.6 X |
| 4,998,311 | 3/1991 | Ernst . | |
| 5,152,579 | 10/1992 | Bishai | 297/284.6 |
| 5,743,594 | 4/1998 | Suskey et al. | 297/354.13 |
| 5,860,699 | 1/1999 | Weeks | 297/284.6 |
| 5,860,702 | 1/1999 | Pilarczyk et al. | 297/354.13 |

*Primary Examiner*—Peter M. Cuomo
*Assistant Examiner*—Rodney B. White
*Attorney, Agent, or Firm*—Malloy & Malloy, P.A.

[57] ABSTRACT

A void or space filling assembly designed to be used in combination with a chair structure of the type having a reclining backrest and normally found in airplane or ground travel vehicles as well as other permanent locations where such chair structures are desirable. The assembly includes a resilient, flexible material bladder which is expandable, upon being at least partially filled with fluid. The bladder is located on the chair structure adjacent the junction between the backrest and seat portion thereof and is specifically disposed and dimensioned to extend in filling and/or covering relation to any spacing or void normally existing at the junction of the backrest and seat portion when the backrest is disposed into its reclined position. The disposition of the bladder in this space filling position will allow for the seat portion, bladder and backrest to collectively define a substantially continuous support surface on which persons can comfortably recline and thereby avoid the discomfort of any significant voids or spaces in the reclining surface.

12 Claims, 2 Drawing Sheets

10 50 12 52 30 22 32 14 20 16 34 18

10 30 32 50 13' 14' 22 20 18 16 12 14

ASSEMBLY FOR FILLING VOID BETWEEN CUSHIONS OF RECLINING SEATS

CLAIM OF PRIORITY

The present application is based on and a claim to priority under 35 U.S.C. Section 119(e) is made to provisional patent application filed with the U.S. Patent Office on Aug. 12, 1997 and assigned Ser. No. 60/055,337.

BACKGROUND OF THE INVENTION

1. Field of the Invention

The present invention relates to a filling assembly designed for use in combination with a seat or chair structure having a seat cushion and a backrest, wherein the backrest is adjustably movable between an upright position and any one of a plurality of reclined positions. More specifically, the assembly of the present invention is structured to fill the void that is created when the backrest of the seat or chair structure is oriented in a completely reclined or substantially horizontal position on a level approximately equal to that of the seat cushion.

2. Description of the Related Art

The existence of chair or seat structures which recline is well recognized, particularly in the travel industry. Typically, such chair structures include upholstered, cushioned seat portion, on which an individual sits, and an attached backrest portion, which supports the back region or area of the individual seated within the chair. The backrest portion is specifically structured to be selectively positionable between a completely upright or normal position and an at least partially reclined or angularly oriented position relative to the cushioned seat portion. In addition, reclining chair structures exist wherein the backrest portion is capable of being oriented in a completely reclined position, relative to the seat portion, such that it is substantially horizontally positioned on approximately the same level as the cushioned seat portion. Chair structures of this type are provided so that a person who is using the reclining chair structure may assume a completely reclined position, i.e., a substantially horizontal position, when desired, for sleeping, resting, etc.

Reclining seat structures of the type described above have been used for many years in both commercial aircraft and private aircraft, as well as on vehicles designed for land travel, such as buses, trains and certain modern day automobiles, vans and trucks. In recent years, however, there has been a tendency to upgrade the comfort and luxury of passengers who travel in such vehicles, especially in what is known as the first class section of airplanes, trains and the like. Chair structures capable of being completely reclined are obviously more desirable for extended trips such as when commercial aircraft or other multi-passenger aircraft travel long distances. While the chair structures which are completely reclined into a substantially horizontal support surface have been well accepted, there is at least one recognized area which detracts from the comfort of a person attempting to sleep or assume the completely reclined, horizontal position for relatively long periods of time. In particular, such chair structures provide a user with some discomfort in that there is typically, a space or void of significant dimension which exists or which is created between the cushion seat portion and the backrest portion at the junction where such ends are normally disposed in immediately adjacent relation to one another. When the backrest portion is disposed in a slight angular orientation or moderately reclined position, relative to the cushioned seat portion, the existence or presence of any type of void or spacing at the junction of the seat portion or backrest is not as pronounced and does not present a problem in terms of a passenger's comfort. However, in order to properly orient the backrest and seat portions in the fully reclined position, the dimension of the aforementioned spacing or void at the junction of the seat portion and backrest is significant and often results in some discomfort to the passenger, particularly if he or she remains fully reclined for a period of time.

Therefore, there is a recognized need in the construction and utilization of reclining seat structures, regardless of whether they are intended for vehicular use or for use in aircraft or indeed, in permanent building structures where completely reclining seat structures are desirable. In particular, there is a need in the art for a device which is directed to filling the void or space that exists at the junction between the cushioned seat portion and the backrest portion of a chair or seat structure that is disposed in a fully reclined position, and which would thereby significantly increase the comfort of the occupant.

SUMMARY OF THE INVENTION

The present invention relates to a void or space filling assembly designed for use in combination with a seat or chair structure being specifically designed to include a seat cushion portion and a backrest portion wherein the backrest portion is adjustably movable between an upright position and any one of a plurality of reclined positions. More specifically, the void filling assembly of the present invention is intended for use wherein the backrest portion of the seat or chair structure is capable of being oriented in a completely reclined or substantially horizontal position on a level approximately equal to that of the seat cushion portion. That is, in the above described orientation wherein the backrest portion is completely reclined into a fully reclined and/or substantially horizontal support position, a void or spacing normally exists between the rearward end of the seat cushion portion and the lower front or forward end of the backrest portion. Because the seat or chair structure in a completely reclined position is typically used to support an individual in a horizontal position for relatively long periods of time, the existence of any type void or spacing at the junction between the seat portion and backrest portion prevents the individual resting in such a reclined position from doing so comfortably.

The void or space filler assembly of the present invention preferably comprises a flexible, resilient material bladder having a hollow interior capable of being selectively inflated or deflated with a fluid such as air, and which is mounted on the reclining chair structure adjacent to and in communication with the junction between the seat portion and backrest portion. By way of example, the inflatable bladder may be mounted in the leading or correspondingly positioned end of the backrest portion immediately adjacent to and at least partially defining the aforementioned junction. Alternatively, the bladder could be mounted in the seat cushion portion at the rearward end thereof immediately adjacent to and at least partially defining the aforementioned junction, or further, if desired, could also be mounted between the foundation of the seat cushion portion, known as the seat pan, and the cushion portion of the seat. It will be appreciated, however, that the filler assembly of the present invention contemplates other locations for mounting the bladder. The bladder of the filler assembly is capable of being selectively moved from a stored position and disposed into its expanded position, upon being inflated with fluid. In the expanded position, the bladder is structured, dimensioned and configured to cover or more specifically, to fill any space or void which occurs between the correspondingly positioned ends of the seat portion and backrest portion when the backrest portion is in the fully reclined, substantially horizontally oriented position. When the bladder is deployed in the expanded position as described, the seat cushion portion, bladder and backrest portion collectively define a substantially continuous, horizontally oriented, support surface on which the user of the chair may completely and comfortably recline. Any discomfort due to the existence of a spacing at the aforementioned junction of a chair structure would be eliminated and the overall comfort of the user of such a chair structure would be greatly enhanced.

In order to provide for the expansion or deflation of the bladder, the present invention preferably includes a fluid supply assembly. Such a fluid supply assembly may, for example, comprise an air motor/compressor mechanism of the type which is recognized to be available in the art relating to the regulation of air flow to form certain expandable chambers which are confined within the backrest portion of some vehicular seats, namely, modern day, luxury automobiles. An air supply motor or similar structure known in the art can be operably connected or coupled to and in direct fluid communication with the hollow interior of the bladder according to the present invention, for example, by way of an appropriate conduit, to cause the expansion thereof, when desired. Further, a manual or automatic fluid release structure can be associated with the subject fluid supply assembly for the deflation of the bladder and its positioning back into a deflated or stored position when the backrest portion is disposed out of its completely reclined position. Naturally, fluid other than air may be used to expand the bladder of the present invention.

The present invention preferably includes a control assembly for either selectively or automatically inflating the bladder into its expanded position so as to fill the void at the junction between the seat portion and backrest portion when the seat structure is disposed in the fully reclined position. Such a control assembly can be automatically activated by providing a sensing means or other structure which is capable of sensing the positioning of the backrest portion and in particular, when the backrest portion has reached the fully reclined position, which in turn, will activate the fluid supply motor causing a predetermined volume of fluid to be transferred to the bladder for expansion and positioning thereof in the space filling position. Upon the backrest moving to its upright or less than fully reclined position, the sensor could therefore activate an appropriate switch structure to in turn cause an opening of a fluid release structure associated with the subject fluid supply assembly.

The seat or chair structure of the present invention has been described for vehicular applications such as airplanes, trains, buses, and automobiles, etc. However, it should also be noted that chair structures capable of obtaining a fully reclined position are also commonly found and used in building structures, such as for example, in lounges or rest areas, and thus, the present invention may will include other applications separate and apart from use within a type of vehicle.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
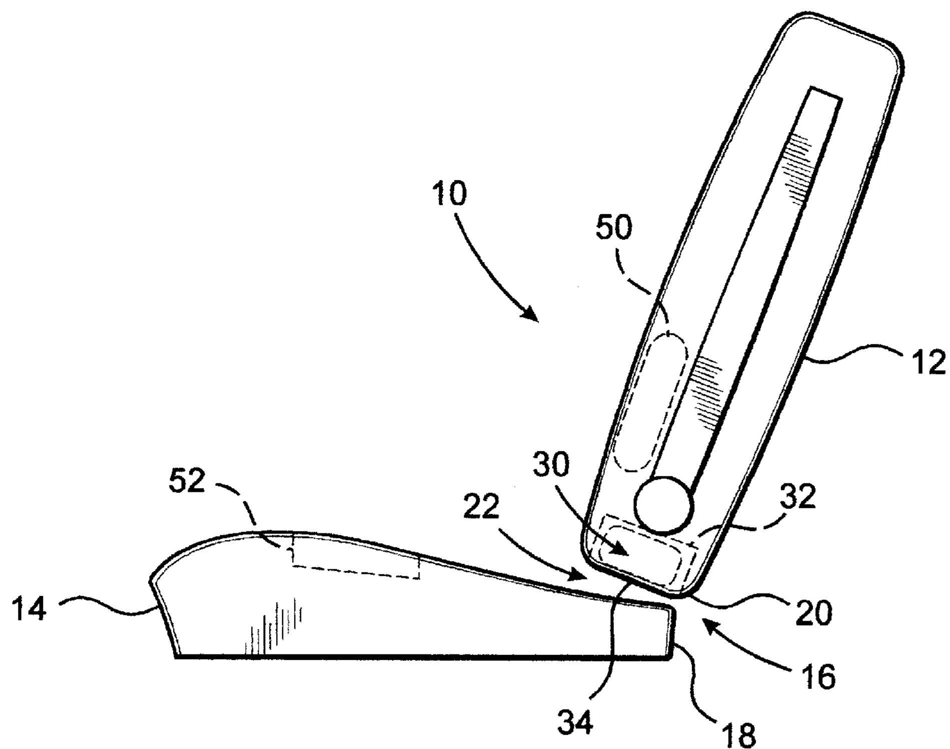
FIG. 1 is a partial side view of a seat or chair structure that is capable of assuming a completely reclined orientation and which has the filling assembly of the present invention mounted thereon.
Figure 2:
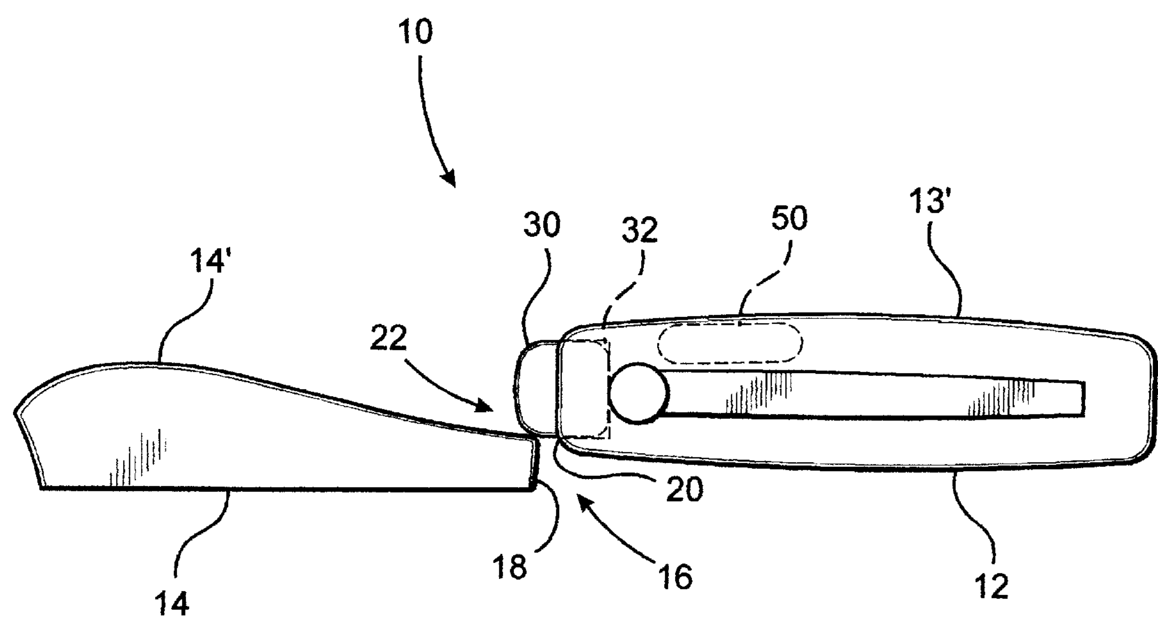
FIG. 2 is a side view of the invention illustrated in FIG. 1 with the seat or chair structure being illustrated in a fully reclined position, and with the bladder of the filling assembly illustrated in an expanded position.

As shown in the accompanying Figures, the present invention relates to a void or space filling assembly specifically designed to be used in combination with a seat or chair structure, 10 of the type shown in FIGS. 1 and 2. As shown in FIG. 2, the chair structure 10 is of the type which is capable of assuming a completely or at least substantially reclined orientation, and such chair structures are known in the art and are not the subject of the present invention. Typically, such chairs are used in vehicles such as, but not limited to, airplanes, buses or certain luxury type automobiles. In particular, the chair structure 10 includes a backrest portion, 12 and a bottom or seat portion 14. Both the backrest portion 12 and the bottom or seat portion 14 are often upholstered or provided with cushioning an padding so as to provide for the increased comfort of a passenger or other user of the chair structure, 10, regardless of whether he is in a sitting upright position or an reclined position, as described in greater detail hereinafter.

When in the completely reclined position of FIG. 2, the backrest portion 12 is seen to be substantially horizontal or level with the seat portion 14 so as to provide a somewhat level or consistently horizontal support surface on which the user may recline. When in the upright or only partially reclined position of FIG. 1, the chair structure 10 includes a junction generally indicated at 16 between the rear or trailing end 18 of the seat portion 14 and the leading or front end 20 of the backrest portion 12. This junction 16 will further include at least a minimal spacing or void as at 22 between the correspondingly position ends 18 and 20. This void or spacing becomes increasingly more pronounced in terms of defining a wider separation between the correspondingly position ends 18 and 20 as the backrest moves away from the upright position of FIG. 1 and into a reclined position as shown in FIG. 2. In fact, the size of the spacing or void 22 at the junction 16 is often so pronounced in the fully reclined position shown in FIG. 2 that any individual assuming a horizontal orientation on the chair structure 10 when in the completely reclined position of FIG. 2, would encounter some discomfort, which is likely to increases the longer that orientation is maintained.

In the preferred embodiment, the present invention includes a void or space filling assembly specifically designed to cover or more specifically fill the spacing 22 when the backrest portion 12 is in the fully reclined or horizontally oriented position illustrated in FIG. 2. Preferably, the filling assembly of the present invention includes an expandable bladder, 30, preferably formed of a resilient, expandable material and having a hollow interior. Because of its expandable nature, the bladder 30 is capable of being selectively disposed between a stored or deflated position as shown in FIG. 1 and an expanded or inflated position, as shown in FIG. 2. When in the expanded position of FIG. 2, the dimension, configuration and disposition of the bladder 30 is such as to extend outwardly from a storage facility or other storage means 32. By way of example, the storage facility 32 may be formed in the interior of the backrest portion 12 immediately adjacent to the end 20 thereof. This storage facility 32 further may include an open face 34 extending along substantially the entire length of the end 20 of backrest portion 12 and may be configured and dimensioned so as to allow the outward extension of the bladder 30 into engagable, at least partially conforming relation, to the end 18 of the seat portion 14. In such an outwardly expanded position, the spacing or void 22 at the junction 16 is effectively filled or covered. It should be appreciated that the location of an adequate storage facility for bladder 30, when deflated, could be anywhere adjacent the junction 16 of the seat portion 14 and backrest portion 12, and still fall within the scope and spirit of the present invention. For example, an additional location for the storage facility could include the area at or adjacent the foundation or seat pan of the seat portion 14 as well as adjacent the rear end 18 of the seat cushion 14.

Other features associated with the present invention include an elongated configuration and overall dimension of both the bladder 30 and any storage facility 32 in which the bladder is mounted. The dimension of both the bladder 30 and the storage facility 32 as well as the aforementioned open end face 34 is such as to allow the continued engagement or contact of the bladder 30 with the ends 18 and 20 of seat portion 14 and backrest 12 when the bladder is in its expanded position. Therefore, when disposed in the operative, expanded position of FIG. 2, the exposed, outer surfaces of the seat cushion as at 14', the backrest portion as at 12, and the bladder 30 form what may be considered a substantially continuous, horizontally oriented, support surface when the backrest 12 is in the completely reclined position. Increased comfort is provided to the user of the chair structure 10 when the void or spacing 22 has been filled.

Figure 3:
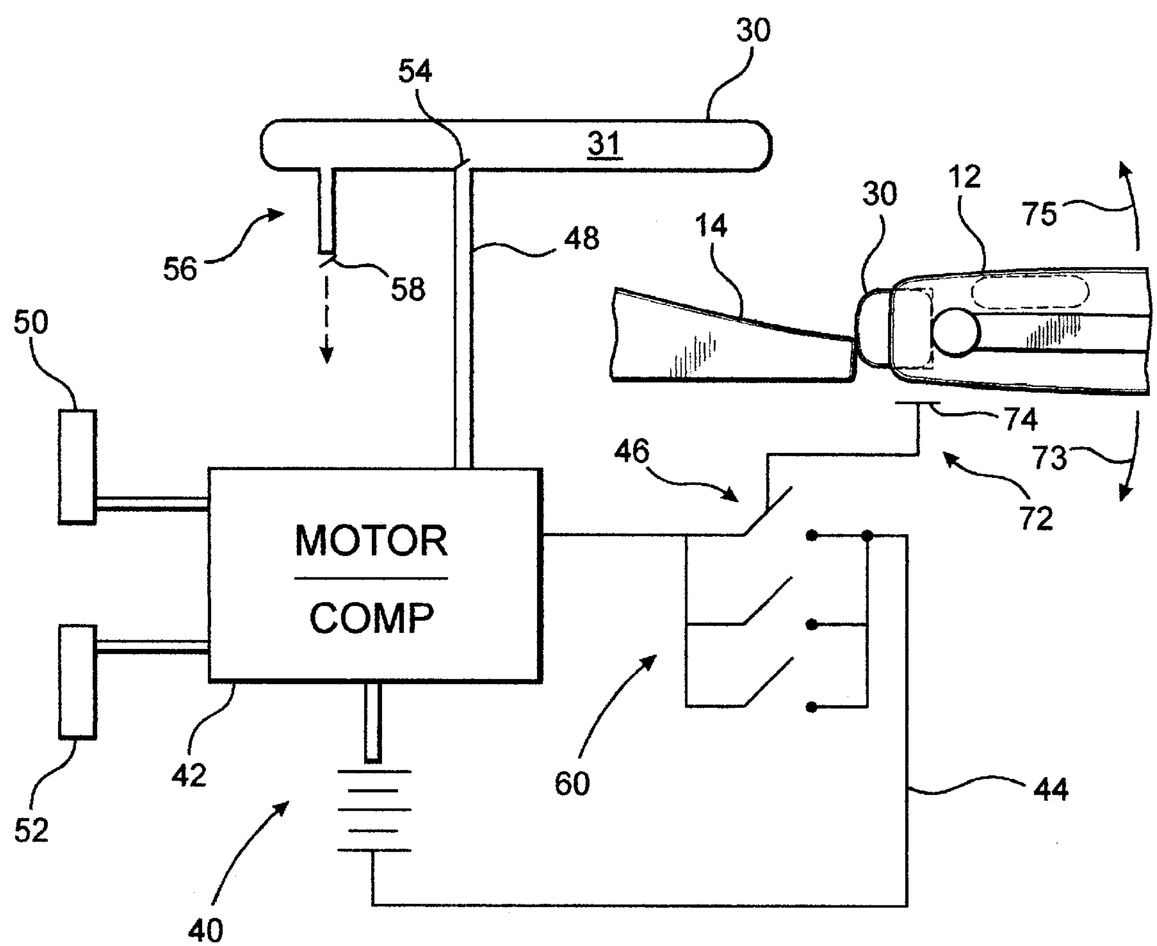
FIG. 3 is a partial schematic representation of the present invention with some structure represented in partial cutaway of the subject assembly.

Turning now to FIG. 3, the present invention preferably includes a fluid supply assembly generally indicated as 40, which is structured to permit the bladder 30 to be selectively filled with air or another fluid, or to have fluid removed therefrom, in the appropriate quantities to position the bladder 30 into either its outwardly expanded position as shown in FIG. 2 or its inwardly stored or deflated position, as shown in FIG. 1. In order to supply air or other fluid in the manner set forth herein, a motor/compressor as at 42 may be mounted adjacent to the chair structure 10 or, dependent upon its size, directly thereon. Such fluid driving motors are available and are in current use for the expansion and contraction of expanding chambers as at 50 currently in existence in seat structures of various types. The expandable chambers as at 50 known in the art are confined within the backrest portion 12 and are used primarily to increase the overall comfort of the user of such a chair assembly by regulating the pressure on the back or under portion of the legs when such chambers 50 and 52 are located in the backrest 12 or seat portion 14, respectively. The present invention is specially directed in to the bladder structure 30, it being recognized that other expandable chambers such as 50 and 52 are known in the art. FIG. 3 is provided to demonstrate that the same motor/compressor used to expand the chambers 50 and 52 may also be used to expand or selectively regulate fluid flow to and from the bladder 30 associated with the present invention.

Further with regard to FIG. 3, the fluid supply assembly may include a circuit as at 44 including at least one switch 46. The closing of the switch 46 will serve to activate the motor and allow fluid flow through appropriate conduits 48 directly into the interior of the bladder 30. A one way valve as at 54 may be utilized to maintain or trap the fluid within the hollow interior 31 of the bladder 30 until it is desired to deflate the bladder and place it in its stored position seen in FIG. 1. A fluid release assembly is generally indicated as 56 and includes an appropriate valve structure 58 which may be manually or automatically operated so as to bleed fluid directly from the interior 31 of the bladder 30. The other switch structures generally indicated as 60 may be utilized to independently activate the motor and/or compressor, through additional, proper circuitry not shown for purposes of clarity, to selectively expand or contract the chambers 50 and 52 recognized as being known in the art.

The present invention preferably includes a control assembly, generally indicated as 72, to automatically activate the fluid supply motor 42 so as to expand the bladder 30 when the backrest portion 12 moves into its fully reclined position as shown in both FIGS. 2, and at least partially in FIG. 3. As movement of the backrest portion 12 assumes its completely reclined or substantially horizontal position as indicated by directional arrow 73, a sensor mechanism as at 74, being part of the control means 72, may be activated either through direct engagement or some type of electronic sensing facility. This activation of the sensor mechanism 74 will in turn cause a closing or proper positioning of the switch 46 which in turn will activate the fluid supply motor 40. Fluid can then be directed into the hollow interior 31. Upon the travel or movement of the backrest 12 in its opposite position to assume an upright orientation as indicated by directional arrow 75, the sensor mechanism 74 of the control assembly 72 will disengage or sense the absence of the backrest 12 in the fully reclined position. The switch member 46 will then be further activated to remove sufficient quantities of fluid from the hollow interior 31 of the bladder 30 so as to allow the bladder to assume its deflated, stored position as shown in FIG. 1.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A filler assembly for use with a chair structure having a seat portion and a backrest disposable into a reclined position relative to said seat portion, said filler assembly comprising:

a bladder formed of a resilient, expandable material and having a substantially hollow interior, said bladder to be mounted on said chair structure immediately adjacent a junction between the seat portion and the backrest, a fluid supply assembly connected to said bladder and structured to selectively regulate fluid flow to and from the hollow interior of the bladder, said bladder positionable between an expanded position and a deflated position dependent upon fluid flow into and out of said bladder, said expanded position defined by an outwardly extended disposition of said bladder into filling relation to a spacing between correspondingly positioned ends of said seat portion and backrest at the junction thereof when the backrest is in the reclined position, the seat portion, bladder and backrest being relatively disposed and constructed to collectively define a substantially continuous support surface when the backrest is in the reclined position.

2. An assembly as recited in claim 1 further comprising a storage facility to be defined on said chair structure adjacent the junction between the backrest and the seat portion, said storage compartment dimensioned to substantially receive the bladder when in said deflated position.

3. An assembly as recited in claim 2 wherein said storage facility is cooperatively structured with said bladder to allow outward extension of said bladder into engagable relation with correspondingly positioned ends of the seat and backrest portion, when said bladder is disposed in said expanded position.

4. An assembly as recited in claim 3 wherein said bladder comprises an elongated configuration of sufficient length to extend along and fill spacing between corresponding ends at the junction of the seat portion and backrest, when said bladder is in said expanded position.

5. An assembly as recited in claim 3 wherein said storage facility comprises an opening disposed adjacent to the junction between the backrest and seat portion, said bladder extending outwardly from said storage facility and through said opening and into engaging relation with the corresponding ends of the seat portion and backrest in covering relation to any spacing along the junction of the seat portion and backrest.

6. An assembly as recited in claim 5 wherein said bladder and said opening comprise elongated configurations of sufficient length to extend along and substantially fill any spacing at the junction between the seat portion and said backrest.

7. An assembly as recited in claim 3 wherein said bladder is formed of sufficiently resilient material to engage and at least partially conform to a configuration of the corresponding ends of the seat portion and backrest when said bladder is in said expanded position.

8. An assembly as recited in claim 1 wherein said fluid supply assembly comprises a fluid supply motor connected in fluid communication with said bladder and structured to deliver fluid, under pressure to the hollow interior thereof, whereby sufficient volumes of fluid are selectively forced into said bladder for disposition thereof into said expanded position.

9. An assembly as recited in claim 8 wherein said fluid supply assembly further comprises a fluid release structure connected in fluid communication with said bladder and structured to selectively release a sufficient volume of fluid therefrom to orient said bladder from said expanded position into said deflated position.

10. An assembly as recited in claim 9 wherein said fluid supply assembly further comprises a control assembly including a power source connected by electric circuit to said fluid supply motor, switch means for regulating current flow between said power source and said fluid supply motor and positionable between an open and closed position dependent on the backrest being in an upright or reclined position.

11. An assembly as recited in claim 10 further comprising a sensor means to be mounted on said chair structure and constructed for sensing the position of the backrest relative to the reclined position, said sensor means connected to said switch means and further structured to position said switch means into said closed position when the backrest is in the reclined position.

12. A filler assembly in combination with a chair structure having a seat portion and a backrest disposable into a reclined position relative to said seat portion, said filler assembly comprising:

a bladder formed of a resilient, expandable material and having a substantially hollow interior, said bladder mounted on said chair structure immediately adjacent a junction between the seat portion and the backrest, a fluid supply assembly connected to said bladder and structured to selectively regulate fluid flow to and from the hollow interior of the bladder, said bladder positionable between an expanded position and a deflated position dependent upon fluid flow into and out of said bladder, said expanded position defined by an outwardly extended disposition of said bladder and into filling relation to a spacing between correspondingly positioned ends of said seat portion and backrest at the junction thereof when the backrest is in the reclined position, a storage facility formed on said chair structure adjacent to the junction between the backrest and seat portion, said storage facility dimensioned to at least partially receive said bladder when in said deflated position, said fluid supply assembly comprising a fluid supply motor connected in fluid communication with said bladder and structured to deliver fluid, under pressure to the hollow interior thereof, and said fluid supply assembly further comprising a fluid release structure connected in fluid communication with said bladder and structured to selectively release a sufficient volume of fluid therefrom to orient said bladder from said expanded position into said deflated position.

* * * * *